United States Patent [19]

Osborn et al.

[11] Patent Number: 4,585,702
[45] Date of Patent: Apr. 29, 1986

[54] MAGNETIC RECORDING MEDIUM

[75] Inventors: Claiborn L. Osborn; Joseph V. Koleske, both of Charleston, W. Va.

[73] Assignee: Union Carbide Corporation, Danbury, Conn.

[21] Appl. No.: 509,390

[22] Filed: Jun. 30, 1983

[51] Int. Cl.$^4$ .............................................. G11B 5/70
[52] U.S. Cl. ............................ 428/425.9; 252/62.54; 360/134; 360/135; 360/136; 427/44; 427/128; 428/694; 428/900; 528/75
[58] Field of Search ............... 428/900, 694, 425.9; 427/44, 128; 422/131, 132; 360/134–136; 528/49, 75; 252/62.54

[56] References Cited

U.S. PATENT DOCUMENTS

| | | | |
|---|---|---|---|
| 3,169,945 | 2/1965 | Hostettler | 528/354 |
| 3,700,643 | 10/1972 | Smith | 525/455 |
| 4,059,715 | 11/1977 | Pletcher | 428/349 |
| 4,154,895 | 5/1979 | Ogawa | 428/694 |
| 4,188,472 | 2/1980 | Chang | 528/75 |
| 4,320,171 | 3/1982 | Motz | 428/900 |
| 4,328,282 | 5/1982 | Lehner | 428/900 |
| 4,411,956 | 10/1983 | Matsufuji | 428/694 |
| 4,415,630 | 11/1983 | Kubota | 428/457 |
| 4,448,846 | 5/1984 | Chang | 428/694 |

FOREIGN PATENT DOCUMENTS 2085906A 5/1982 United Kingdom .

*Primary Examiner*—Ellis P. Robinson
*Attorney, Agent, or Firm*—B. F. Crowe

[57] ABSTRACT

Described is a magnetic recording medium comprising a substrate and a magnetic recording layer therein comprising a binder and magnetic particles, the binder comprising a lactone-acrylate adduct.

27 Claims, No Drawings

MAGNETIC RECORDING MEDIUM

BACKGROUND OF THE INVENTION

Described herein is a magnetic recording medium comprising a substrate and a magnetic recording layer thereon comprising a cured binder and magnetic particles, the binder comprising a lactone-acrylate adduct.

Magnetic recording media in the form of magnetic cards and disks, reels, video tapes, computer tapes etc. are generally prepared by coating a non-magnetizable backing member, such as polyethylene terephthalate film, with a coating of magnetizable particles in a binder. The binder can be made from a variety of thermoplastic and thermosetting resins. For example, in U.S. Pat. No. 4,059,715 there is described, as a binder, a thermoplastic copolyester consisting of 5 to 75 percent by weight of amorphous ester units and 95 to 25 percent by weight of crystallizable ester units joined through the ester linkages. U.K. Patent Application No. GB 2085906, published May 6, 1982, describes a particular thermosetting resin as a binder, which is stated to be preferred because of its favorable effects upon the physical properties such as resistance to wear, heat and solvents of the final magnetic recording medium. In the U.K. Patent Application, the magnetic recording medium is made by using: (A) a compound having two or more radiation-curable, unsaturated double bonds and a molecular weight of not less than 5000, (B) a compound having one or more radiation curable, unsaturated double bonds and a molecular weight of over 400 and less than 5000, and (C) a compound having one or more radiation-curable, unsaturated double bonds and a molecular weight of less than 400. The substrate is then coated with a magnetic material, stated in the U.K. Patent Application to be composed essentially of a binder which is a mixture of the compounds (A) and (B), or of (A), (B), and (C), magnetic particles, and a solvent. The coating is stated to be predryed and then the coated matter is irradiated with electromagnetic rays. The compound (A) is one prepared by reacting either a partly saponified vinyl chloride-vinyl acetate copolymer or a vinyl chloride-vinyl alcohol copolymer, obtained by saponifying almost all of the acetyl groups of the vinyl chloride-vinyl acetate copolymer, with a polyisocyanate compound, and then reacting the resulting isocyanate-containing compound with an acrylic or methacrylic compound having a functional group reactive with the isocyanate group. The compound (B) is one prepared by reacting a polyol with a polyisocyanate compound and then reacting the resulting isocyanate-containing compound with an acrylic or methacrylic compound having a functional group reactive with the isocyanate group. The compound (C) is described (on page 4) of the U.K. Patent Application as styrene, ethylacrylate, ethylene glycol diacrylate, ethylene glycol dimethacrylate, diethylene glycol diacrylate, diethylene glycol dimethacrylate, 1,5-hexane glycol diacrylate, 1,6-hexane glycol dimethacrylate, trimethylolpropane triacrylate, and trimethylolpropane trimethacrylate.

The U.K. Patent Application states that the above-mentioned compounds (A), (B), and (C), when adopted singly, will provide radiation curable coatings but will not always give a magnetic coating material of good physical properties. It is by mixing the compounds (A), (B), and (C) of different molecular weights that curability is stated to be attained even with a low dosage of about 1-3 mrads, and many different physical property requirements can be met. Especially, the binders consisting of the (A)-(B) and (A)-(B)-(C) combinations are stated to be superior to the binder of the (A)-(C) combination in bonding ability, flexibility, etc.

In the present invention it has been found that a select group of materials can be used as binders in magnetic recording materials. The use of these binders results in a magnetic recording material which has an excellent balance of mechanical properties.

THE INVENTION

This invention is directed to magnetic recording medium comprising a substrate and a magnetic recording layer thereon comprising a cured binder and magnetic particles, the binder comprising a lactone-acrylate adduct. The lactone-acrylate adduct may, optionally, be reacted with one or more of the following:

(a) a multi-functional isocyanate,
(b) a polyol and a multi-functional isocyanate,
(c) a polyol, a multi-functional isocyanate, and an hydroxyalkyl acrylate, or
(d) a polyol, a multi-functional isocyanate, an hydroxyalkyl acrylate and a reactive solvent.

The preferred binder comprises the reaction product of a polyol, a multi-functional isocyanate, a lactone-acrylate adduct and an hydroxyalkyl acrylate.

The binder of this invention may additionally contain the reaction product of a polyol, a multi-functional isocyanate and an hydroxyalkyl acrylate and/or the reaction product of an hydroxyalkyl acrylate and a multi-functional isocyanate.

The lactone-acrylate adduct that is suitable for use in this invention is prepared by reacting a lactone with an hydroxyalkyl acrylate. The lactones suitable for use in preparing the lactone-acrylate adduct are characterized by the following formula:

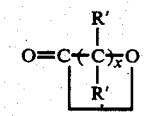

wherein the R's are independently hydrogen or alkyl of from 1 to 12 carbon atoms, and x is from 4 to 7. The preferred lactone is epsilon-caprolactone.

The hydroxylalkyl acrylates used in this inventin include 2-hydroxyethyl acrylate, hydroxypropyl acrylate, hydroxybutyl acrylate, 2-hydroxy-3-chloro-propyl acrylate, 2,3-dihydroxy propyl acrylate, and the like, or mixtures thereof. Hydroxyethyl acrylate is preferred. Minor amounts of hydroxyalkyl methacrylates may be included.

The lactone-acrylate adduct is prepared by reacting the lactone with the hydroxyalkyl acrylate in the presence of less than about 200 parts per million of a catalyst. The catalyst which may be used includes one or more organometallic compounds and other metallic compounds such as stannic chloride or ferric chloride and other Lewis and protonic acids. Preferred catalysts include stannous octonoate, dibutyltin dilaurate, and other tin compounds; titanates such as tetraisopropyl titanate and butyl titanate; and the like.

The reaction is carried out at a temperature of from about 100° to about 140° C., preferably from about 120° to about 130° C. The reaction may be carried out at atmospheric pressure, although higher or lower pressures may be used. The reaction is generally carried out in the presence of oxygen to inhibit polymerization of the hydroxy-alkyl acrylate. The reaction is carried out for a period of from about 2 to about 20, preferably from about 3 to about 11 hours. The reaction is carried out in the presence of a suitable inhibitor to prevent polymerization of the hydroxyalkyl acrylate double bond. These inhibitors include the monomethyl ether of hydroquinone, benzoquinone, phenothiazine, methylhydroquinone, 2,5-di-t-butylquinone, hydroquinone, and other common free radical inhibitors known in the art. The level of inhibitor used is less than 1000 parts per million, preferably less than 800 parts per million, and most preferably, less than 600 parts per million.

The lactone-acrylate adduct contains from one to about 10 moles of lactone per mole of hydroxyalkyl acrylate.

The multi-functional isocyanates suitable for use herein are known in the art and include the aliphatic and aromatic diisocyanates. Many such compounds are known to those skilled in the art and illustrative thereof one can mention 2,4-tolylene diisocyanate, 2,6-tolylene diisocyanate, isophorone diisocyanate, 4,4'-diphenylmethane diisocyanate, di(2-isocyanatoethyl)-bicyclo (2.2.1) hept-5-ene-2,3-dicarboxylate, 3,5,5-triethyl-1-isocyanato-3-isocyanato-methylcyclohexane, 1,6-hexamethylene diisocyanate, m- and p-xylene diisocyanate, cylcohexane-1,4-diisocyanate, dicyclohexyl-4,4'-methane diisocyanate, tetramethylene diisocyanate, cyclopentylene-1,3-diisocyanate, 1,3-diisocyanate, 1,4-xylylene diisocyanate, 1,5-naphthalene diisocyanate, m-phenylene diisocyanate, p-phenylene diisocyanate, hexamethylene diisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, 3,3'-dimethoxy 4,4'-dimethyl 4,4'-biphenylene diisocyanate, durene diisocyanate, 1-phenoxy-2,4-phenylene diisocyanate, 1-tert-butyl-2,4-phenylene diisocyanate, 2,2,4-trimethylhexamethylene diisocyanate, 1,3,5-benzene triisocyanate, 2,4,6-toluene triisocyanate, and the like, or mixtures thereof.

Substantially any of the organic polyols previously used in the art to make coating compositions can be used in this invention. Illustrative of the polyols useful in producing coating compositions in accordance with this invention are the polyether polyols such as polyhydroxyalkanes and polyoxyalkylene polyols, the acrylic and vinyl polyols, the polyester polyols, the polycaprolactone polyols and other lactone polyols such as polyvalerolactone polyols, poly-methyl-caprolactone polyols, etc., the polymer/polyols, and the like. Among the polyether polyols which can be employed are those selected from one or more of the following classes of compositions, alone or in admixture, known to those skilled in the art:

(a) Alkylene oxide adducts of polyhydroxyalkanes;
(b) Alkylene oxide adducts of non-reducing sugars and sugar derivatives;
(c) Alkylene oxide adducts of phosphorus and polyphosphorus acids;
(d) Alkylene oxide adducts of polyphenols;
(e) The polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. A preferred class of alkylene oxide adducts of polyhydroxyalkanes are the ethylene oxide, propylene oxide, butylene oxide, or mixtures thereof, adducts of trihydroxyalkanes.

A further class of polyether polyols which can be employed are the alkylene oxide adducts of the non-reducing sugars, wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosides as set forth in U.S. Pat. No. 3,073,788.

The alkylene oxide adducts of phosphorus and polyphosphorus acids are another useful class of polyether polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

A still further useful class of polyether polyols is the polyphenols, and preferably the alkylene oxide adducts thereof wherein the alkylene oxides have from 2 to 4 carbon atoms. Among the polyphenols which are contemplated are, for example, bisphenol A, bisphenol F, condensation products of phenol and formaldehyde, the novolac resins, condensation products of various phenolic compounds and acrolein; the simplest member of this class being the 1,1,3-tris(hydroxyphenyl)propanes, condensation products of various phenolic compounds and glyoxal, glutaraldehyde, and other dialdehydes, the simplest members of this class being the 1,1,2,2,-tetrakis(hydroxyphenol)ethanes, and the like.

The polyols described hereinabove can have hydroxyl numbers which vary over a wide range. In general, the hydroxyl numbers of the above described polyols employed in this invention can range from about 15, and lower, to about 900, and higher. The hydroxyl number is defined as the number of milligrams of potassium hydroxide required for the complete neutralization of the fully phthalated derivative prepared from 1 gram of polyol. The hydroxyl number can also be defined by the equation:

$$OH = 56.1 \times 1000 \times f/m.w.$$

where
OH = hydroxyl number of the polyol;
f = functionality, that is, average number of hydroxyl groups per molecule of polyol; and
m.w. = molecular weight of the polyol.

The polyether polyols described hereinabove can be prepared by conventional methods and are commercially available from a number of manufacturers.

The polycaprolactone polyols, alone or in admixture, that can be used to prepare the coating compositions of this invention include any of the known polycaprolactone polyols that are commercially available and that are fully described, for example, in U.S. Pat. No. 3,169,945. As described in this patent the polycaprolactone polyols are produced by the ring-opening polymerization of an excess of a caprolactone and an organic polyfunctional initiator having as least two reactive hydrogen atoms. The organic functional initiators can be any polyhydroxyl compound as is shown in U.S. Pat. No. 3,169,945. Illustrative thereof are the diols such as ethylene glycol, diethylene glycol, triethylene glycol, 1,2-propylene glycol, dipropylene glycol, 1,3-propylene glycol, polyethylene glycol, polypropylene glycol, poly(oxyethylene-oxypropylene)glycols, neopentyl glycol, 1,4-cyclohexanedimethanol, 2,4,4-trimethyl pentanediol, 2,2-dimethyl-3-hydroxypropyl 2,2-dimethyl-3-hydroxypropionate, and similar polyalkylene glycols, either blocked, capped or heteric, containing up to about 40 or more alkyleneoxy units in the molecule, 3-methyl-1-5-pentanediol, cyclohexanediol, 4,4'-methylene-bis-cyclohexanol, 4,4'-isopropylidene bis-cyclohexanol, xylenediol, 2-(4-hydroxymethylphenyl)ethanol, 1,4-butanediol, 1,6-hexanediol and the like; triols such as glycerol, trimethylolpropane, 1,2,6-hexanetriol, triethanolamine, triisopropanolamine, and the like; tetrols such as erythritol, pentaerythritol, N,N,N',N'-tetrakis(2-hydroxyethyl)ethylene diamine, and the like.

When the organic functional initiator is reacted with the caprolactone a reaction occurs that can be represented in its simplest form by the equation:

$$R_1(OH)_x + O=C(C(R')_2)_4CHR' \longrightarrow$$

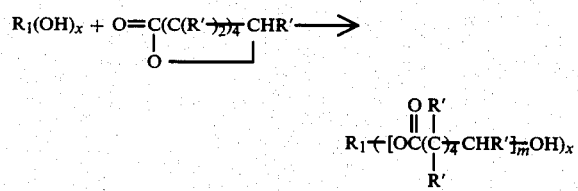

In this equation the organic functional initiator is the $R_1(OH)_x$ compound and the caprolactone is the

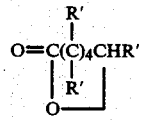

compound; this can be ε-caprolactone itself or a substituted caprolactone wherein R' is an alkyl, alkoxy, aryl, cycloalkyl, alkaryl or aralkyl group having up to twelve carbon atoms and wherein at least six of the R' groups are hydrogen atoms, as shown in U.S. Pat. No. 3,169,945. The polycaprolactone polyols that are used are shown by the formula on the right hand side of the equation; they can have an average molecular weight of from 200 to about 6,000. The preferred polycaprolactone polyol compounds are those having an average molecular weight of from about 290 to about 6,000, most preferably from about 290 to 3,000. The most preferred are the polycaprolactone diol compounds having an average molecular weight of from about 290 to about 1,500 and the polycaprolactone triol and tetrol compounds having an average molecular weight of from about 290 to about 3,000. In the formula m is an integer representing the average number of repeating units needed to produce the compound having said molecular weights. The hydroxyl number of the polycaprolactone polyol can be from about 15 to 600, preferably from 200 to 500; and the polycaprolactone can have an average of from 2 to 8, preferably 2 to 4, hydroxyl groups.

Illustrative of polycaprolactone polyols that can be used in the coating compositions of this invention, one can mention the reaction products of a polyhydroxyl compound having an average from 2 to 6 hydroxyl groups with caprolactone. The manner in which these type polycaprolactone polyols is produced is shown in U.S. Pat. No. 3,169,945 and many such compositions are commercially available. In the following table there are listed illustrative polycaprolactone polyols. The first column lists the organic functional initiator that is reacted with the caprolactone and the average molecular weight of the polycaprolactone polyol is shown in the second column. Knowing the molecular weights of the initiator and of the polycaprolactone polyol one can readily determine the average number of molecules of caprolactone (CPL Units) that reacted to produce the compounds; this figure is shown in the third column.

| | POLYCAPROLACTONE POLYOLS | | |
|---|---|---|---|
| | Initiator | Average MW of polyol | Average No. of CPL units in molecules |
| 1 | Ethylene glycol | 290 | 2 |
| 2 | Ethylene glycol | 803 | 6.5 |
| 3 | Ethylene glycol | 2,114 | 18 |
| 4 | Propylene glycol | 874 | 7 |
| 5 | Octylene glycol | 602 | 4 |
| 6 | Decalene glycol | 801 | 5.5 |
| 7 | Diethylene glycol | 527 | 3.7 |
| 8 | Diethylene glycol | 847 | 6.5 |
| 9 | Diethylene glycol | 1,246 | 10 |
| 10 | Diethylene glycol | 1,998 | 16.6 |
| 11 | Diethylene glycol | 3,526 | 30 |
| 12 | Triethylene glycol | 754 | 5.3 |
| 13 | Polyethylene glycol(MW 200)* | 713 | 4.5 |
| 14 | Polyethylene glycol(MW 600)* | 1,398 | 7 |
| 15 | Polyethylene glycol(MW 1500)* | 2,868 | 12 |
| 16 | 1,2-Propylene glycol | 646 | 5 |
| 17 | 1,3-Propylene glycol | 988 | 8 |
| 18 | DiPropylene glycol | 476 | 3 |
| 19 | Polypropylene glycol(MW 425)* | 835 | 3.6 |
| 20 | Polypropylene glycol(MW 1000)* | 1,684 | 6 |
| 21 | Polypropylene glycol(MW 2000)* | 2,456 | 4 |
| 22 | Hexylene glycol | 916 | 7 |
| 23 | 2-Ethyl-1,3-hexanediol | 602 | 4 |
| 24 | 1,5-Pentanediol | 446 | 3 |
| 25 | 1,4-Cyclohexanediol | 629 | 4.5 |
| 26 | 1,3-Bis(hydroxyethyl)-benzene | 736 | 5 |
| 27 | Glycerol | 548 | 4 |
| 28 | 1,2,6-Hexanetriol | 476 | 3 |
| 29 | Trimethylolpropane | 590 | 4 |
| 30 | Trimethylolpropane | 750 | 5.4 |
| 31 | Trimethylolpropane | 1,103 | 8.5 |
| 32 | Triethanolamine | 890 | 6.5 |
| 33 | Erythritol | 920 | 7 |
| 34 | Pentaerythritol | 1,219 | 9.5 |
| 35 | 1,4-Butanediol | 546 | 4.0 |
| 36 | Neopentyl glycol | 674 | 5.0 |

*Average molecular weight of glycol.

The structures of the compounds in the above tabulation are obvious to one skilled in the art based on the information given. The structure of compound No. 7 is idealized as:

wherein the variable r is an integer, the sum of r+r has an average value of 3.7 and the average molecular weight is 527. The structure of compound No. 20 is idealized as:

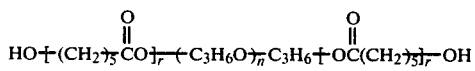

wherein the sum of r+r has an average value of 6 and the average molecular weight is 1,684. This explanation makes explicit the structural formulas of compounds 1 to 34 set forth above.

Polycaprolactone hexols suitable for use in the present invention can be prepared by the catalytic polymerization of an excess of polycaprolactone polyols and a cycloaliphatic epoxide. Illustrative polycaprolactone polyols useful in the preparation of polycaprolactone hexols include polycaprolactone diols, polycaprolactone triols and the like including mixtures thereof. Many of these polycaprolactone polyols are commercially available from Union Carbide Corporation. Cycloaliphatic epoxides suitable for use in preparing the polycaprolactone hexols include 3,4-epoxycyclohexylmethyl-3,4-epoxycyclohexane carboxylate, bis(3,4-epoxycyclohexylmethyl)adipate, vinyl cyclohexene dioxide and the like. Many of these cycloaliphatic epoxides are commercially available from Union Carbide Corporation. A suitable polymerization catalyst is diethylammonium triflate which is commercially available from the 3M Company as FC-520.

A preferred method for preparation of the polycaprolactone hexols comprises adding one or more polycaprolactone triols to a reactor, heating the polycaprolactone triols to a temperature of about 100° C. and adding the catalyst using a nitrogen sparge as soon as the polycaprolactone triols are molten. The polycaprolactone triols and catalyst mixture is then heated to a temperature of from about 150° C. to about 200° C. and a cycloaliphatic epoxide is added to the mixture. The reaction is carried out for about one hour to about three hours or until the oxirane content has been reduced to a nil or almost a nil value. A modification of this process can involve initially adding all of the ingredients into the reactor. A further modification of this method can involve a vacuum treatment of from 10 to 30 minutes after the catalyst addition and/or the use of a vacuum during the heating of the polycaprolatone triols to a molten state. Preferred polycaprolactone hexols suitable as ingredients in the coating compositions of this invention have an average molecular weight of from about 600 to about 1500.

The polymer/polyols that can be used to prepare the binder of this invention are known materials. Such polymer/polyols can be produced by polymerizing one or more ethylenically unsaturated monomers dissolved or dispersed in a base polyol in the presence of a free radical catalyst. The production of polymer/polyols is more fully described in U.S. Pat. No. Re. 28,715, U.S. Pat. No. Re. 29,118, U.S. Pat. No. 3,652,639, U.S. Pat. No. Re. 29,014, U.S. Pat. No. 3,950,317, U.S. Pat. No. 4,208,314, U.S. Pat. No. 4,104,236, U.S. Pat. No. 4,172,825 and U.S. Pat. No. 4,198,488.

While poly(oxypropylene)polyols are preferred, substantially any of the polyols previously used in the art to make polymer/polyols can be used as the base polyol. Illustrative of the base polyols useful in producing polymer/polyol compositions are the polyether polyols such as polyhydroxyalkanes and polyoxyalkylene polyols, or the like. Among the base polyols which can be employed are those selected from one or more of the following classes of compositions, alone or in admixture, known to those skilled in the art and described more fully hereinabove:

(a) Alkylene oxide adducts of polyhydroxyalkanes;
(b) Alkylene oxide adducts of non-reducing sugars and sugar derivatives;
(c) Alkylene oxide adducts of phosphorus and polyphosphorus acids;
(d) Alkylene oxide adducts of polyphenols;
(e) The polyols from natural oils such as castor oil, and the like.

The most preferred base polyols employed in the polymer/polyols which are useful as ingredients in the coating compositions of this invention include the poly(oxypropylene)polyols. It should be appreciated that a blend or mixture of more than one base polyol can be utilized, if desired, to form the polymer/polyol.

Conceptually, the monomers used in preparing the polymer/polyols can comprise any ethylenically unsaturated monomer or monomers. A variety of monomers are disclosed in the patents relating to polymer/polyols previously referred to. The selection of the monomer or monomers used will depend on considerations such as the relative cost of the monomers and the product characteristics required for the intended application.

The preferred monomer and monomer mixture used to make the polymer portion of the polymer/polyols is acrylonitrile and a mixture of acrylonitrile and styrene respectively. The relative weight proportions of acrylonitrile to styrene can range from about 80:20 to about 20:80. It may be desirable in some applications to utilize, with acrylonitrile, a comonomer other than styrene. Representative examples of suitable comonomers include methyl methacrylate, vinyl chloride and vinylidene chloride.

The polymer and polyol content of the polymer/polyols can vary within wide limits, depending upon the requirements of the anticipated end use application. In general, the polymer content will vary from about 10 to about 50 percent, based upon the weight of the polymer/polyol. The polyol content of the polymer/polyols varies from about 50 to about 90 percent, based upon the weight of the polymer/polyol.

The polymer/polyols may, if desired, be blended with other conventional polyols described hereinabove to reduce the polymer content to the level desirable for the particular end use application. Blends in which the resulting polymer content is as low as 4 percent of the total weight of the blend or even less may be useful in the coating compositions of this invention.

The most preferred classes of polyols employed in the coating compositions of this invention are the polycaprolactone polyols such as TONE-0200 and TONE-0305 commercially available from Union Carbide Corporation, the dihydroxyl functional polytetramethylene oxide polyols such as Polymeg 650, 1000 and 2000 commercially available from Quaker Oats Company, the polymer/polyols such as NIAX Polymer Polyol 31-23 and 34-28 commercially available from Union Carbide Corporation, and of course the ethylene oxide and propylene oxide adducts including ethylene glycol, diethylene glycol, the poly(oxyethylene)glycols, the poly(oxypropylene)glycols, triols and higher functionality polyols such as LHT-67, LHT-112, and LG-56 commercially available from Union Carbide Corporation. These polyols also include poly(oxypropylene-oxyethylene)polyols; however, desirably, the oxyethylene content should comprise less than 80 percent of the total and preferably less than 60 percent. The ethylene oxide when used can be incorporated in any fashion along the polymer chain. Stated another way, the ethylene oxide can be incorporated either in internal blocks, as terminal blocks, such as the propylene oxide polyols capped with ethylene oxide, i.e., NIAX Polyol 11-27 and 11-34 and E-474, commercially available from Union Carbide Corporation, or may be randomly distributed along the polymer chain. As is well known in the art, the polyols that are most preferred herein contain varying small amounts of unsaturation. Unsaturation in itself does not affect in any adverse way the formation of the coating compositions in accordance with the present invention.

Other preferred representative examples of organic polyols that may be employed in the coating compositions of this invention include copolymers of hydroxypropyl and hydroxyethyl acrylates and methacrylates with other free radically polymerizable monomers such as acrylate esters, vinyl halides, vinyl acetate or styrene; copolymers containing pendent hydroxy groups formed by hydrolysis or partial hydrolysis of vinyl acetate copolymers, polyvinylacetal resins containing pendent hydroxyl groups; modified cellulose polymers such as hydroxyethylated and hydroxypropylated cellulose; hydroxy terminated polyesters, hydroxy terminated polyalkadienes, and styrene alkyl alcohol copolymers. The polyester polyols are the reaction products of polyfunctional organic carboxylic acids and polyhydric alcohols and include, for example, poly(hexamethylene adipate), poly(ethylenne adipate), poly(butylene adipate) and the like. Many of these organic polyols can be prepared by conventional methods and are commercially available from a number of manufacturers such as polyvinylacetal resins commercially available from Monsanto Chemical Company as Butvar B-72A, B-73, B-76, B-90 and B-98 and as Formvar 7/70, 12/85, 7/95S, 7/95E, 15/95S and 15/95E; an aliphatic polyester diol commercially available from Rohm and Haas as Paraplex U-148; saturated polyester polyols commercially available from Mobay Chemical Company as Multron R-2, R-12A, R-16, R-18, R-38, R-68, and R-74; a hydroxypropylated cellulose having an equivalent weight of approximately 100 commercially available from Hercules, Inc. as Klucel E; and a cellulose acetate butyrate ester having a hydroxyl equivalent weight of approximately 400 commercially available from Eastman Kodak as Alcohol Soluble Butyrate.

Another preferred class of polyols utilized in this invention are polyester polyols as described in U.S. patent application Ser. No. 469,433 filed in the name of L. A. Domeier et al on Feb. 24, 1983, titled "Polyester Polyols Based On Lactones" and assigned to the same assignee as this application.

The polyester polyols as described in said application has a molecular weight of less than about 3000 and is produced from the ring opening reaction of a lactone with a polyfunctional initiator, wherein the minimum percent of lactone hydroxyls, y, (i.e. those hydroxyls attached to an open lactone) in the polyester polyols is a function of the mole ratio, x, of lactone units to active hydrogens in the initiator and can be defined as $y = 52.5x$ for $x > 0$ to $1.5$ and $y = 2.11x + 75.6$ for $x > 1.5$.

The polyester polyol are prepared by the ring opening reaction of a lactone with a polyfunctional initiator. The preferred lactone is ε-caprolactone. The initiators are of the formula $$A(BH)_a$$

in which A is an organic radical selected from the group consisting of aliphatic, cycloaliphatic, aromatic and heterocyclic radicals, a is a number equal to the functionality of the initiator, and the B is selected from —O—, —NH—, —NR$^2$— (R$^2$ is selected from alkyl, aryl, aralkyl or cycloalkyl), —S—, and —C(O)O—.

The type of BH groups in a single initiator may be identical or may vary as in aminoalcohols, hydroxycarboxylic acids, and the like.

Preferred initiators are organic polyols in which the BH groups are hydroxyl groups.

The molecular weight (number average, Mn) of the polyol product is less than 3000, and preferably less than about 1500.

The reaction of the lactone and the polyfunctional initiator is preferably carried out in the presence of a catalyst.

The catalysts which may be used include one or more organometallic compounds and other metallic compounds such as stannous chloride and other Lewis and protonic acids. Preferred catalysts include stannous octanoate, dibutyltin dilaurate, and other tin compounds; titanates such as tetraisopropyl titanate and butyl titanate; and the like. Any of the catalysts commonly used in ring-opening polmerizations of lactones may be used in the practice of this invention.

The catalyst is used in conventional amounts of from about 0.1 to 50 parts per million based on the total weight of the lactone.

The reaction may be effected in a solvent which must be free of active hydrogen groups such as hydrocarbon solvents. The reaction is preferably carried out neat, in the absence of any solvent.

The reaction may be carried out at atmospheric pressure, although higher or lower pressures may be used.

The reaction is carried out at a temperature of from about 100° to about 200° C., preferably from about 140° to about 170° C. The reaction is carried out for a period of from about 1 to about 24 hours, preferably from about 3 to about 8 hours. It is important to avoid extended reaction times and excessive reaction temperatures which lead to a gradual decrease in the percent of lactone hydroxyl groups.

The organic polyol utilized in the binder of this invention can be mixtures or blends of organic polyols. For example, when utilizing a polycaprolactone polyol, it may be desirable to mix or blend one or more of a propylene oxide polyol, a propylene oxide polyol capped with ethylene oxide, a polytetramethylene oxide polyol or a propylene/polyol therewith. Other mixtures or blends may similarly be used if desired.

The binders of this invention when they contain components in addition to the lactone-acrylate adduct may be prepared by adding the components in a number of different ways. For example, the polyol, multi-functional isocyanate, lactone-acrylate adduct, and optionally the hydroxyalkyl acrylate may be all added together. Further, the lactone may be reacted with the hydroxyalkyl acrylate followed by addition of the multi-functional isocyanate and polyol, and optionally, more hydroxyalkyl acrylate may be added. Also, the polyol may be reacted with the multi-functional isocyanate followed by the reaction of this product with the lactone-acrylate adduct and, optionally, more hydroxyalkyl acrylate and/or reactive solvents. The non-reactive solvent may be added at any point.

The preferred binder is prepared by reacting the lactone-acrylate adduct with the multi-functional isocyanate followed by the reaction of that product with the polyol, and, optionally, additional hydroxyalkyl acrylate. A non-reactive solvent may be added at any point.

The reaction is generally carried out in the presence of a catalyst. The catalyst which may be used herein includes one or more organometallic compounds and other metallic compounds such as stannic chloride or ferric chloride and other Lewis and protonic acids. Preferred catalysts include stannous octonoate, dibutyltin dilaurate, and other tin compounds; titanates such as tetraisopropyl titanate and butyl titanate; and the like. The catalyst is used in amounts of from 0.001 to about 5 percent and preferably from about 0.1 to about 2 percent.

The reaction is carried out at a temperature of from about 25° to about 150° C., preferably from about 40° to about 80° C. The reaction may be carried out at atmospheric pressure, although higher or lower pressures may be used. The reaction is carried out for a period of from about 2 to about 72, preferably from about 1 to about 24 hours.

The reaction is carried out in the presence of a suitable inhibitor to prevent polymerization of the hydroxyalkyl acrylate double bond. These inhibitors include those described above in the amounts described above.

The reaction may be carried out in the presence of a reactive or a conventional solvent. Suitable reactive solvents which can be employed are defined by the formula:

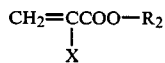

wherein X is hydrogen or methyl and $R_2$ can be substituted or unsubstituted alkyl, cycloalkyl, alkenyl, aryl, or aralkyl, wherein the substituent can be alkoxy, hydroxy, cyano, or amino, or $R_2$ can be carbamoyloxy alkyl which can be N-alkyl substituted.

Illustrative of suitable reactive solvents one can mention: mono functional alkyl acrylates having up to about 12 carbon atoms in the alkyl segment such as ethyl acrylate, butyl acrylate, 2-ethylhexyl acrylate, amyl acrylate, n-lauryl acrylate, nonyl acrylate, n-octyl acrylate, isooctyl acrylate, isodecyl acrylate, etc.; alkoxyalkyl acrylates such as methoxybutyl acrylate, ethoxyethyl acrylate, ethoxypropyl acrylate, etc.; hydroxyalkyl acrylates such as hydroxyethyl acrylate, hydroxybutyl acrylate, etc.; alkenyl acrylates such as trimethoxyallyloxymethyl acrylate, allyl acrylate, etc.; aralkyl acrylates such as phenoxyethyl acrylate, benzyl acrylate, etc.; cycloalkyl acrylates such as cyclohexyl acrylate, cyclopentyl acrylate, isobornyl acrylate, etc.; aminoalkyl acrylates such as diethylaminoethyl acrylate; cyanoalkyl acrylates such as cyanoethyl acrylate, cyanopropyl acrylate, etc.; carbamoyloxy alkyl acrylates such as 2-carbamoyloxyethyl acrylate, 2-carbamoyl-oxypropyl acrylate, N-methylcarbamoyloxyethyl acrylate, N-ethylcarbamoyloxymetyl acrylate, 2-(N-methylcarbamoyloxy)-propyl acrylate, and 2-(N-ethylcarbamoyloxy)propyl acrylate, etc. The lactone-acrylate adduct or the mono isocyanate capped lactoneacrylate adduct may also be used as the reactive solvent.

Also, multi-functional alkyl acrylates may be used such as 1,6-hexanediol diacrylate, neopentyl glycol diacrylate, tetraethyleneglycol diacrylate, esterdiol-204-diacrylate, trimethylolpropane triacrylate, triethylene glycol diacrylate, the diacrylate of alkoxylated esterdiol 204, such as the 4-mole ethylene oxide adduct of esterdiol 204, and the lactone-acrylate adduct reacted with a multi-functional isocyanate may also be used. Also, N-vinyl pyrrolidone may be used. Further, acrylated oils such as the reaction product of epoxidized soybean oil and/or epoxidized linseed oil and acrylic acid may be used.

The concentration of reactive solvent in the binder can be from zero to about 70 weight percent, preferably from about 5 to about 50 weight percent. The concentration used is selected so as to obtain the desired application viscosity in the coating composition.

Conventional solvents include cyclohexanone, toluene, methyl isobutyl ketone, tetrahydrofuran, methyl amyl ketone, ethoxy ethyl acetate, and the like and mixtures of these solvents such as, for example, a 2:2:1 mixture of methyl isobutyl ketone, toluene and cyclohexane.

When conventional solvents are used, they are employed at a concentration of from 1 to about 99%, the concentration being dependent on the viscosity needed for proper application or other characteristics. Generally, the conventional or inert solvents will be removed or partially removed by evaporation with or without the use of thermal energy before the radiation cure is effected.

In the preferred binder of this invention, for each mole of polyol, from 1.25 to 6 moles of multi-functional isocyanate and 0.5 to 8 moles of hydroxy functional acrylate may be used as the reactants.

The binder of this invention can be cured by ionizing or non-ionizing radiation means including, but not limited to, ultraviolet light and electron beam radiation. When the binder is mixed with the magnetic particles this system is cured by ionizing radiation, specifically electron beam radiation. These curing methods and the equipment that can be used for them are well known to those skilled in the art. When the binder is to be cured by non-ionizing radiation, the presence of a photoinitiator therein is desirable. Any of the known photoinitiators can be used. Illustrative of suitable photoinitiators one can mention 2,2-diethoxyacetophenone, 2- or 3- or 4-bromoacetophenone, 3- or 4-allylacetophenone, 2-acetonaphthone, benzaldehyde, benzoin, the alkyl benzoin ethers, benzophenone, benzoquinone, 1-chloroanthraquinone, p-diacetyl-benzene, 9,10-dibromoanthracene, 9,10-dichloroanthracene, 4,4-dichlorobenzophenone, thioxanthone, methylthioxanthone, α, α, α, -trichloro para t-butyl acetophenone, 4-methoxybenzophenone, 3-chloro-8-nonylxanthone, 3-iodo-7-methoxyxanthone, benzaldehyde, carbazole, 4-chloro-4'-benzylbenzophenone, fluorene, fluorenone, 1,4-naphthylphenylketone, 2,3-pentanedione, 2,2-di-sec-butoxy acetophenone, dimethoxyphenyl acetophenone, propiophenone, chlorothioxanthone, xanthone and the like, or any mixtures of these. The foregoing list is meant to be illustrative only and is not meant to exclude any suitable photoinitiators known to those skilled in the art. Those skilled in the art will know the concentrations at which photoinitiators are effectively employed and generally the concentration will not exceed 15 weight percent of the radiation curable coating composition.

Those skilled in the art of photochemistry are fully aware that photoactivators can be used in combination with the aforementioned photoinitiators and that synergistic effects are sometimes achieved when such combinations are used. Photoactivators are well known in the art and require no further description to make known what they are and the concentrations at which they are effective. Nonetheless, one can mention as illustrative of suitable photoactivators, methylamine, tributylamine, methyldiethanolamine, 2-aminoethylethanolamine, allylamine, cyclohexylamine, cyclopentadienylamine, diphenylamine, ditolylamine, trixylylamine, tribenzylamine, n-cyclohexy-lethylenimine, piperidine, N-methylpiperazine, 2,2-dimethyl-1,3-bis(3-N-morpholinyl) propionyloxypropane, and the like, or any combination of these.

The binders of this invention can also be cured upon exposure to any source of radiation emitting actinic radiation at a wavelength within the ultraviolet and visible spectral regions. Suitable sources of radiation include mercury, xenon, carbon arc lamps, sunlight, etc. Exposures may be from less than about 1 second to 10 minutes or more depending upon the amounts of particular polymerizable materials and photoinitiator being utilized and depending upon the radiation source and distance from the source and the thickness of the coating to be cured. The compositions may also be photopolymerized by exposure to electron beam radiation. Generally speaking the dosage necessary is from less than 1 megarad to 100 megarads or more.

The binder of this invention may also include one or more thermoplastic resins free from any radiation-curable, unsaturated bond. Among useful thermoplastic resins for this purpose are vinyl chloride-vinyl acetate copolymers and other vinyl chloride resins, cellulose nitrate, cellulose acetate and other polyester resins, polyvinyl alcohol resins, epoxy resins, cellulose nitrate, cellulose acetate and other cellulose derivatives, thermoplastic polyurethane resins, polyamide resins, polycaprolactone, polyacrylate polyvinylidene chloride, and acrylic resins. The addition of such a thermoplastic resin is effective in balancing hardness, toughness, flexibility and other properties of the product.

The substrate to be coated with the magnetic coating material in accordance with the present invention may be a polyethylene terephthalate or polypropylene film that is in wide use as a base material for magnetic recording media. Where heat resistance is an important consideration, a polyimide film, polyamide film or the like may be utilized. In the case of a polyester film as a thin base, it is often used after monoaxial or biaxial orienting. It is well known that pretreatment of the film may be beneficial to promote wetting and adhesion.

The magnetic particles which may be used in the present invention are acicular or granular $\gamma$—$Fe_2O_3$, $Fe_3O_4$, Co-doped $\gamma$—$Fe_2O_3$, Co-doped $\gamma$—$Fe_2O_3$—$Fe_3O_4$ solid solution, Co-base-compound-adsorbed $\gamma$—$Fe_2O_3$, a Co-base-compound-adsorbed $Fe_3O_4$ (including those oxidized to an intermediate state between itself and $\gamma$—$Fe_2O_3$), and acicular $CrO_2$. (The term "Co-base compound" as used herein means cobalt oxide, cobalt hydroxide, cobalt ferrite, cobalt ion-adsorbates and the like which enable the magnetic particles to take advantage of the magnetic anisotropy of cobalt in improving its coercive force.) Also, the magnetic particle consisting essentially of a ferromagnetic metal element or alloy, such as Co, Fe—Co, Fe—Co—Ni, or the like may be suitably employed. Such a fine magnetic particle is prepared in a number of ways, including wet reduction of the starting material with a reducing agent such as $NaBH_4$, a treatment of the iron oxide surface with a Si compound and subsequent dry reduction with $H_2$ gas or the like, and vacuum evaporation in a low-pressure argon gas stream. Fine particles of monocrystalline barium ferrite may be employed as well. The fine magnetic powder is used in the form of acicular or granular particles, depending on the application of the resulting magnetic recording medium.

For the magnetic coating material of the invention, it is advisable to use various additives usually employed for these applications, such as an antistatic agent, lubricant, dispersant, sensitizer, leveling agent, wear-resisting agent, and film-reinforcing agent, to suit the particular end use.

The recording medium of this invention may generally be prepared by dissolving the binder in sufficient volatile vehicle to provide a coatable dispersion of fine magnetizable particles. The dispersion can then be coated onto the substrate to provide a coating thereon. The magnetic recording medium may be prepared by methods described in the art such as in, for example, S. Tachihara, "Magnetic Coatings and their Applications in Japan", Progress in Organic Coatings, 10 (1982), pages 195 to 204.

The magnetic coating medium may be a magnetic recording tape, magnetic cards, program cards, disks, reels, and the like.

EXAMPLES

The following examples serve to give specific illustration of the practice of this invention but they are not intended in any way to act to limit the scope of this invention.

The following designations used in the examples have the following meaning:

Polyol I: a dihydroxyfunctional polycaprolactone polyol with an average hydroxyl number of 212 and an average molecular weight of 530 (TONE-0200 obtained from Union Carbide Corporation).

Preparation of Caprolactone Adduct

A 50-gallon glass-lined reactor was equipped with a stirrer, temperature control, and nitrogen/air inlet and outlet tubes and used as the reaction vessel. Epsilon-caprolactone was dried by contacting it with molecular sieves. Then, 242 pounds of the dried epsilon-caprolactone and 100 grams of the monomethyl ether of hydroquinone dissolved in a small amount of epsilon-caprolactone were introduced into the reaction vessel and heated to 100° C. while sparging the system with nitrogen. When the temperature reached 100° C., the nitrogen sparge was changed to a nitrogen blanket and air sparge was started. A mixture of 124 pounds of 2-hydroxyethyl acrylate, and 100 ppm of stannous octanoate was added. The reaction temperature was increased to 125° C. and the reaction mixture was held at this temperature for 12 hours. It was then cooled to room temperature (about 25° C.), and collected as a residue product. The product had a hydroxyl number of 179.2, an acid number of 3.13, a Brookfield viscosity of 79 centipoise (at 25° C.), and a water content of 135 ppm.

EXAMPLE 1

Into a 500 ml. four-necked, round-bottomed flask equipped with an air condenser, mechanical stirrer, dropping funnel, thermometer, heating mantle, and dry air blanket were charged 177 g of 2-ethylhexyl acrylate, 110 g of isophorone diisocyanate, 0.5 g of dibutyltin dilaurate, and 2,6-di-tert-butyl-4-methylphenol. The mixture was heated to 55° C. and 133 g of Polyol I was added dropwise through a dropping funnel. After complete addition of the Polyol I, 172 g. of Caprolactone Adduct I was added dropwise through the dropping funnel. The reaction mixture was maintained at 55°–60° C. until the isocyanate level was less than 0.1 wt. %, as determined by titration with dibutylamine.

EXAMPLE 2

The procedure of Example 1 was exactly repeated except that the flask was charged with 168 g. of 2-ethylhexyl acrylate, 87 g. of toluene diisocyanate, 0.5 g of dibutyltin dilaurate and 2,6-di-tert-butyl-4-methylphenol. 133 g. of Polyol I were added to the heated mixture. After complete addition of the polyol, 172 g. of Caprolactone Adduct I was added and the procedure as described in Example 1 continued.

EXAMPLE 3

The procedure of Example 1 was exactly repeated except that the flask was charged with 188 g. of 2-ethylhexyl acrylate, 94 g. of toluene diisocyanate, 0.5 g of dibutyltin dilaurate and 2,6-di-tert-butyl-4-methylphenol. 95 g. of Polyol I were added to the heated mixture. After complete addition of the polyol, 245 g. Caprolactone Adduct I was added and the procedure as described in Example 1 continued.

EXAMPLE 4

Preparation of Dispersion for Coating and Radiation Curing 150 grams of a mixture containing 50 parts of magnetic iron oxide (Pferrox 2228HC obtained from Pfiser Co.), 43 parts of cyclohexanone and 5 parts of the product of Example 1 was added to a Premier Dispersator (obtained from Premier Mill Corp.) and ground for 40 minutes at 4000 rpm. The Dispersator had a tip speed of 1832 feet/min and a 1.75 inch disk.

To 8 parts of the ground mixture was added 28 parts of cyclohexanone.

EXAMPLE 5

The procedure of Example 4 was exactly repeated except that the product of Example 1 was replaced with 5 parts of the product of Example 2.

EXAMPLE 6

The procedure of Example 4 was exactly repeated except that the product of Example 1 was replaced with 5 parts of the product of Example 3.

The dispersions of Examples 4 to 6 were applied to Mylar film with a #20 draw-down rod and cured with an Energy Sciences Electro-Cure curing unit at a line speed of 22 feet/minute and a terminal voltage of 200 kv. Each sample was cured at less than 8 megarands and a dose rate of 2–4 megarands. The dry thickness of the film was 0.2 mils. The coating was hard, had good acetone resistance, and had good adhesion.

What is claimed is:

1. A magnetic recording medium comprising a substrate and a magnetic recording layer thereon comprising a cured binder and magnetic particles, the binder comprising the reaction product of a lactone-acrylate adduct with:
    (a) a multi-functional isocyanate;
    (b) a polyol and a multi-functional isocyanate;
    (c) a polyol, a multi-functional isocyanate, and a hydroxyalkyl acrylate; or
    (d) a polyol, a multi-functional isocyanate, a hydroxyalkyl acrylate and a reactive solvent.

2. A magnetic recording medium as defined in claim 1 wherein the lactone-acrylate adduct is prepared by reacting a lactone with an hydroxyalkyl acrylate.

3. A magnetic recording medium as defined in claim 2 wherein the lactone is characterized by the following formula:

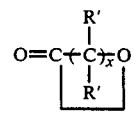

wherein the R's are independently hydrogen or alkyl of from 1 to 12 carbon atoms, and x is from 4 to 7.

4. A magnetic recording medium as defined in claim 3 wherein the lactone is epsilon-caprolactone.

5. A magnetic recording medium as defined in claim 2 wherein the hydroxyalkyl acrylate is selected from 2-hydroxyethyl acrylate, hydroxypropyl acrylate, hydroxybutyl acrylate, 2-hydroxy-3-chloro-propylacrylate, 2,3-dihydroxy propyl acrylate, or mixtures thereof.

6. A magnetic recording medium as defined in claim 5 wherein the hydroxyalkyl acrylate is hydroxyethyl acrylate.

7. A magnetic recording medium as defined in claim 1 wherein the binder comprises the reaction product of a lactone-acrylate adduct with a multi-functional isocyanate.

8. A magnetic recording medium as defined in claim 7 wherein the multi-functional isocyanate is selected 2,4-tolylene diisocyanate, 2,6-tolylene diisocyanate, isophorone diisocyanate, 4,4'-diphenylmethane diisocyanate, di(2-isocyanatoethyl)-bicyclo (2.2.1) hept-5-ene-2,3-dicarboxylate, 3,5,5-triethyl-1-isocyanato-3-isocyanato-methylcyclohexane, 1,6-hexamethylene diisocyanate, m- and p-xylene diisocyanate, cyclohexane-1,4-diisocyanate, dicyclohexyl-4,4'-methane diisocyanate, tetramethylene diisocyanate, cyclopentylene-1,3-diisocyanate, 1,3-diisocyanate, 1,4-xylylene diisocyanate, 1,5-naphthalene diisocyanate, m-phenylene diisocyanate, p-phenylene diisocyanate, hexamethylene diisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, 3,3'-dimethoxy 4,4'-dimethyl 4,4'-biphenylene diisocyanate, durene diisocyanate, 1-phenoxy-2,4-phenylene diisocyanate, 1-tert-butyl-2,4-phenylene diisocyanate, 2,2,4-trimethylhexamethylene diisocyanate, 1,3,5-benzene triisocyanate, 2,4,6-toluene triisocyanate toluene, or mixtures thereof.

9. A magnetic recording medium as defined in claim 1 wherein the binder comprises the reaction product of a lactone-acrylate adduct with a multi-functional isocyanate and a polyol.

10. A magnetic recording medium as defined in claim 9 wherein the polyol is selected from the group consisting of a polyether polyol, a polycaprolactone polyol, a polyester polyol, an acrylic polyol, a vinyl polyol, a polymer/polyol, or mixtures thereof.

11. A magnetic recording medium as defined in claim 10 wherein the polyether polyol is selected from the group consisting of a propylene oxide polyol, an ethylene oxide polyol, a propylene oxide polyol capped with ethylene oxide, ethylene oxide/propylene oxide copolymers, a tetramethylene oxide polyol and a polymer/-polyol.

12. A magnetic recording medium as defined in claim 9 wherein the polyol is a polymer polyol.

13. A magnetic recording medium as defined in claim 9 wherein the polyol is a polyepsilon-caprolactone polyol.

14. A magnetic recording medium as defined in claim 9 wherein the polyol is a polyester polyol.

15. A magnetic recording medium as defined in claim 9 wherein the polyol is an acrylic polyol.

16. A magnetic recording medium as defined in claim 9 wherein the polyol is a vinyl polyol.

17. A magnetic recording medium as defined in claim 1 wherein the binder comprises the reaction product of a lactone-acrylate adduct with a polyol, a multifunctional isocyanate and an hydroxyalkyl acrylate.

18. A magnetic recording medium as defined in claim 17 wherein the hydroxyalkyl acrylate is as defined in claim 5.

19. A magnetic recording medium as defined in claim 1 wherein the binder comprises the reaction product of a lactone-acrylate adduct with a polyol, a multifunctional isocyanate, and an hydroxyalkyl acrylate in a reactive solvent.

20. A magnetic recording medium as defined in claim 19 wherein the reactive solvent is of the following formula:

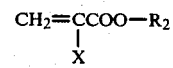

wherein X is hydrogen or methyl and $R_2$ can be substituted or unsubstituted alkyl, cycloalkyl, alkenyl, aryl, or aralkyl, wherein the substituent can be alkyoxy, hydroxyl, cyano, or amino, or $R_2$ can be carbamoyloxy alkyl which can be N-alkyl substituted.

21. A magnetic recording medium as defined in claim 19 wherein the reactive solvent is a multi-functional alkyl acrylate.

22. A magnetic recording medium as defined in claim 21 wherein the reactive solvent is 1,6-hexanediol diacrylate, neopentyl glycol diacrylate, tetramethyleneglycol diacrylate, esterdiol-204-diacrylate, trimethylolpropane triacrylate, triethyleneglycol diacrylate, the diacrylate of esterdiol 204, or mixtures thereof.

23. A magnetic recording medium as defined in claim 19 wherein the reactive solvent is N-vinylpyrrolidone.

24. A magnetic recording medium as defined in claim 19 wherein the reactive solvent is a lactone-acrylate adduct reacted with a multi-functional isocyanate.

25. A magnetic recording medium as defined in claims 1 or 7 or 9 or 17 or 19 which contains a non-reactive solvent.

26. A magnetic recording medium as defined in claim 24 wherein the solvent is cyclohexanone, toluene, methyl isobutyl ketone, tetrahydrofuran, methyl amyl ketone, ethoxy ethyl acetate, and mixtures thereof.

27. A magnetic recording medium as defined in claims 1 or 7 or 9 or 17 or 19 or 25 which contains the reaction product of a polyol, a multi-functional isocyanate and an hydroxyalkyl acrylate and/or the reaction product of an hydroxyalkyl acrylate and multi-functional isocyanate.

* * * * *